(12) United States Patent
Chen et al.

(10) Patent No.: US 6,243,939 B1
(45) Date of Patent: Jun. 12, 2001

(54) HIGH ION BEAM ETCH SELECTIVITY FOR PARTIAL POLE TRIM APPLICATION

(75) Inventors: Mao-Min Chen, San Francisco; Cherng-Chyi Han; Cheng-Teh Wu, both of San Jose; Jei-Wei Chang, Cupertino, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/412,630

(22) Filed: Oct. 4, 1999

(51) Int. Cl.$^7$ ..................................................... G11B 5/42
(52) U.S. Cl. ................................. 29/603.14; 29/603.15; 216/22; 216/66
(58) Field of Search ........................... 29/603.14, 603.15; 216/22, 66

(56) References Cited

U.S. PATENT DOCUMENTS

| | | | |
|---|---|---|---|
| 5,438,747 | 8/1995 | Krounbi et al. | 29/603 |
| 5,726,841 | 3/1998 | Tong et al. | 360/122 |
| 5,804,085 * | 9/1998 | Armstrong et al. | 29/603.15 X |
| 5,867,890 | 2/1999 | Hsiao et al. | 29/603.14 |
| 5,874,010 | 2/1999 | Tao et al. | 216/22 |
| 5,878,481 | 3/1999 | Feng et al. | 29/603.15 |
| 5,901,432 * | 5/1999 | Wu et al. | 29/603.14 |

* cited by examiner

*Primary Examiner*—Carl E. Hall
(74) *Attorney, Agent, or Firm*—George O. Saile; Stephen B. Ackerman; William J. Stoffel

(57) ABSTRACT

A method of manufacturing a magnetic transducer structure using a special pole etch using an IBE preferably with Kr or Xe, and a write gap material with a high IBE etch rate such as Ta, NiCu alloys, Pd, Pd—Cu alloys. A first layer of pole material and a write gap insulating layer are formed over the substrate. The write gap layer is composed of a material having a high ion beam etch rate compared to the first and second layers of pole material. The write gap insulating layer is preferably composed of Ni—Cu alloy, Pd, Pd—Cu alloys. Next, a second layer of pole material is formed on the first insulating layer. In a key step, we ion beam etch (IBE) the second pole; the write gap insulating layer and the first layer; the second pole serving as an etch mask during the ion beam etching to form a head. In a second preferred embodiment of the invention, the ion beam etching performed using a gas of Kr or Xe. The invention teaches a high IBE etch selectivity from the write gap dielectric to the upper pole (NeFe) for partial pole trim (PPT) applications by three embodiments: (a) selecting high IBE rate gap dielectric materials (e.g., NiCu alloys, Pd, and Pd—Cu alloys, (b) using an IBE gas Kr or Xr or both, instead of Ar, and (c) both (a) and (b).

19 Claims, 4 Drawing Sheets

Figure 5:
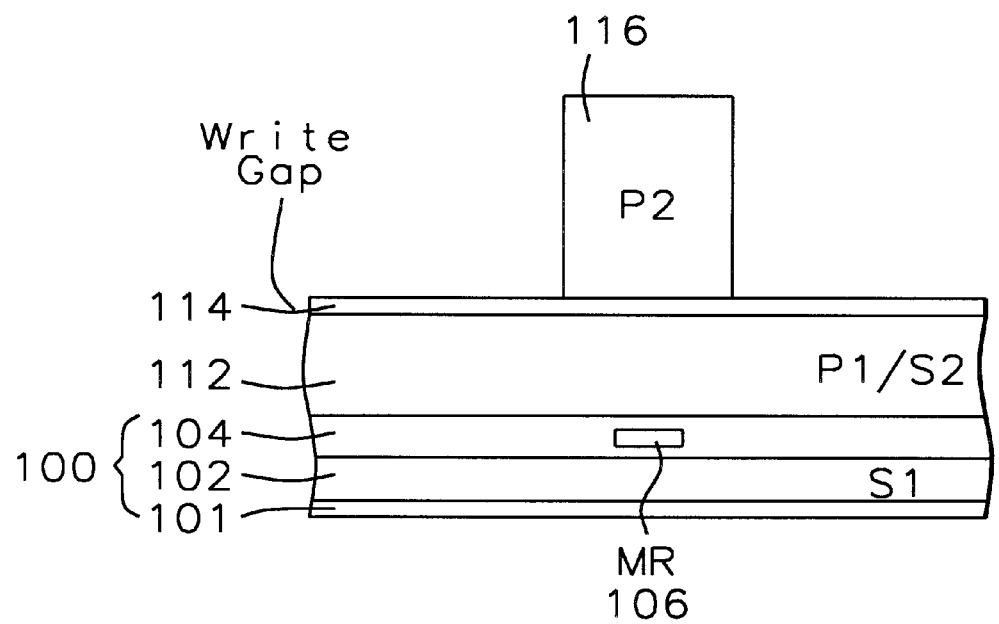

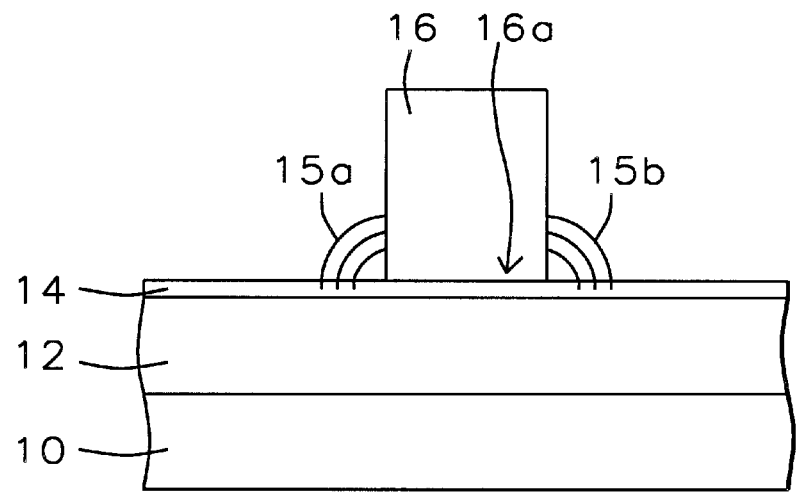
*FIG. 1 — Prior Art*
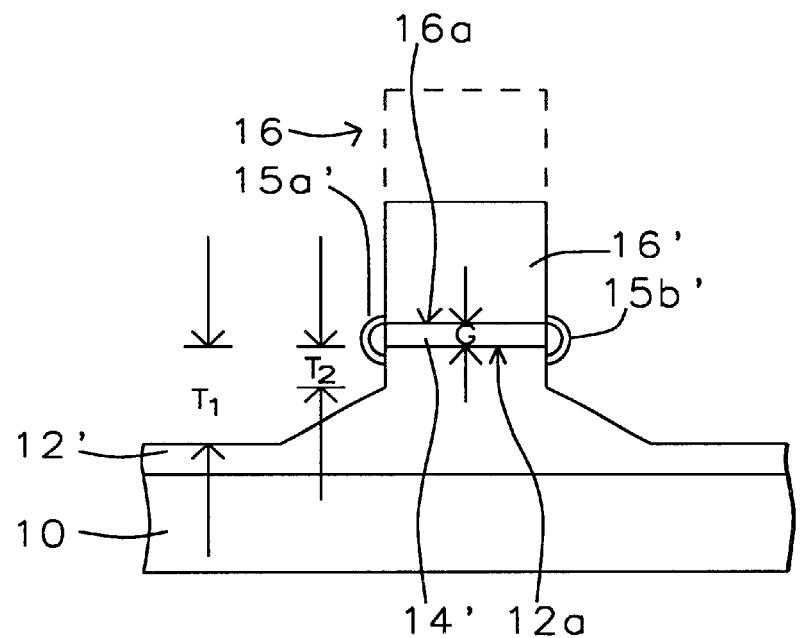
*FIG. 2 — Prior Art*

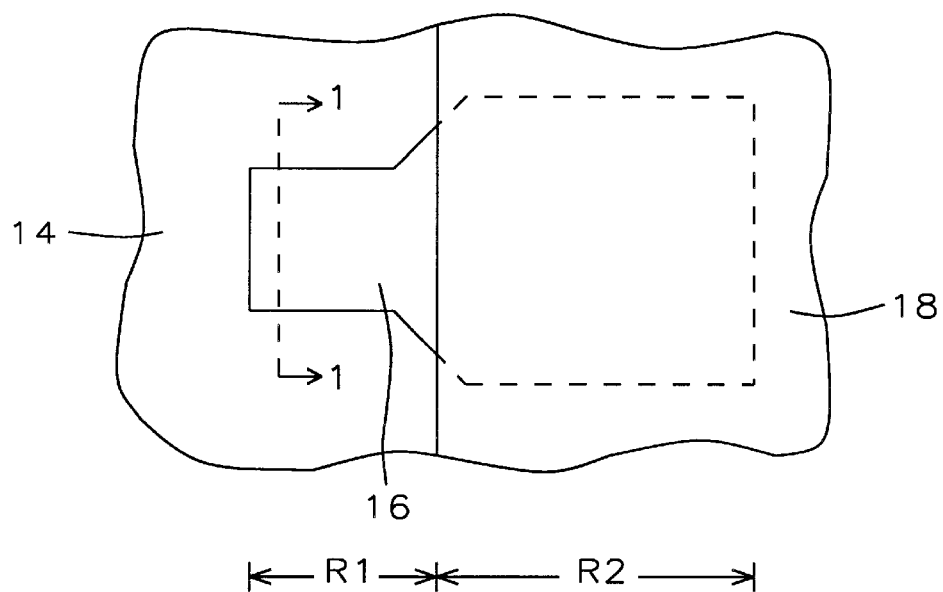
FIG. 3 - Prior Art
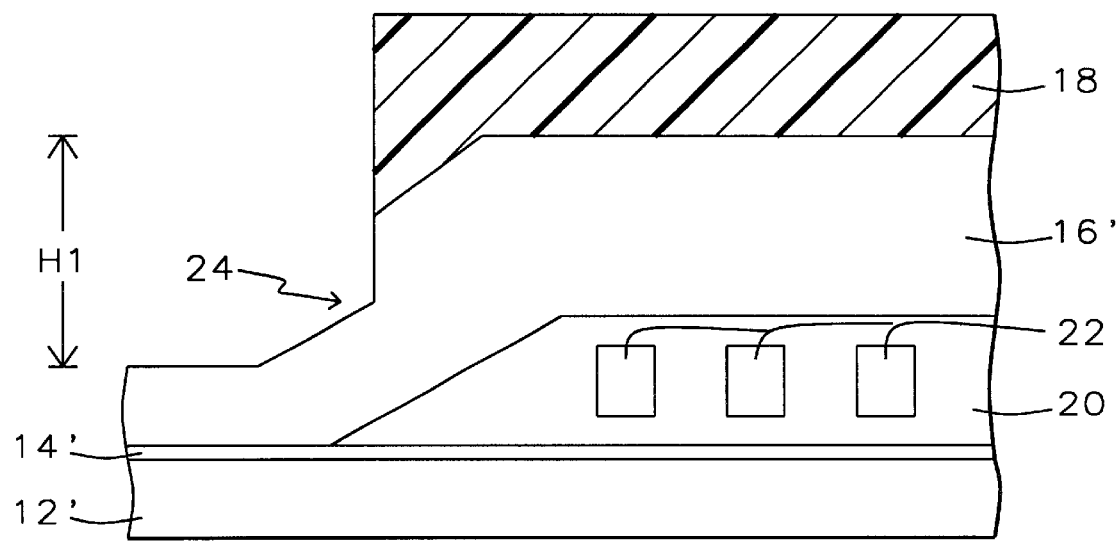
FIG. 4 - Prior Art

HIGH ION BEAM ETCH SELECTIVITY FOR PARTIAL POLE TRIM APPLICATION

BACKGROUND OF THE INVENTION

1). Field of the Invention

This invention relates to thin film magnetic heads, and in particular, to a method for fabricating narrow track width write heads comprising poles made of laminated pole-piece material and more particularly to a Ion beam Etch (IBE) process for trimming poles and to a specific material for the pole and write gate material that increases selectivity of the IBE.

2). Description of the Prior Art

Typical magnetic disk drives include a magnetic disk and a read-write head for recording data in and reading data from the disk. It has been a goal of industry to increase the recording density in magnetic disks. In order to achieve this goal, read-write heads have been developed comprising an inductive write element and a magnetoresistive read element. In addition, magnetic disks exhibiting high coercivity and low noise have been developed.

It is known in the art to use "pole-tip trimming" to reduce the write fringing field. (The fringing field is that portion of the magnetic field generated by the write element and extending toward tracks adjacent to the track being written to. It is important to minimize the write fringing field, especially when recording in disks having a high track density (i.e., disks recorded using a narrow pole width) because otherwise, the fringing field might partially erase or garble data in adjacent tracks.

At present, ion beam etching ("IBE") is the only proven high-volume etching technique for trimming deposited pole-piece layers into poles.

The use of IBE for patterned etching requires a mask to protect the portions of the read-write head that are not to be etched. The most common mask for IBE is photoresist. However, due to relatively low etch selectivity, thick photoresist is required for pole trimming. (Photoresist Etch selectivity refers to the ratio of the rate at which the pole-piece material is etched to the rate at which the photoresist is etched during IBE.) This limits the efficacy of using photoresist as a mask for trimming very narrow poles (e.g. poles with an aspect ratio greater than 2.0). Further, due to thick photoresist mask requirements, "redeposition" and "shadowing" become a severe problem when trimming narrow, high aspect ratio poles. After the photoresist mask is removed, "fencings" or "rabbit ears" remain above the pole-pieces. To minimize the "fencing" problem, a complicated, long ion-milling process, e.g. using multi-angle ion milling and a tedious post-milling photoresist stripping step, is used.

With regard to the magnetic read-write characteristics of a magnetic read-write head employed in reading and writing digitally encoded magnetic data from and into a magnetic data storage medium, it is known in the art of magnetic read-write head fabrication that increased track spacings of magnetic data tracks within magnetic data storage media are required when employing inductive magnetic write heads which exhibit increased write fringe fields bridging their magnetic transducer pole layers. Increased write fringe field widths within inductive magnetic write heads typically result from non-symmetric magnetic pole layers within those inductive magnetic write heads. A schematic cross-sectional diagram of a typical inductive magnetic write head formed with non-symmetric magnetic pole layers is illustrated in FIG. 1.

Shown in FIG. 1 is a substrate 10 having formed thereupon a lower magnetic pole layer 12 separated from an upper magnetic pole tip 16a within a patterned upper magnetic pole layer 16 by a gap filling dielectric layer 14. Also shown in FIG. 1 bridging from the lower magnetic pole layer 12 to the patterned upper magnetic pole layer 16 is a pair of write fringe fields 15a and 15b.

It is also known in the art of magnetic read-write head fabrication that write fringe fields, such as the write fringe fields 15a and 15b as illustrated in FIG. 1, formed incident to non-symmetric magnetic pole layer alignment within inductive magnetic write heads, may be significantly reduced by partially etching the wider of the two non-symmetric magnetic pole layers while employing the narrower of the two non-symmetric magnetic pole layers as a mask to form within the wider of the two non-symmetric magnetic pole layers a pole tip self-aligned with the pole tip within the narrower of the two non-symmetric magnetic pole layers. A schematic cross-sectional diagram illustrating the results of such partial etching practiced upon the lower magnetic pole layer 12 as illustrated in FIG. 1 is shown in FIG. 2.

Shown in FIG. 2 is a partially etched lower magnetic pole layer 12' having formed therein a lower magnetic pole tip 12a separated from the upper magnetic pole tip 16a within a partially etched patterned upper magnetic pole layer 16' by a patterned gap filling dielectric layer 14'. There is also shown in FIG. 2 bridging from the partially etched patterned upper magnetic pole layer 16' to the partially etched lower magnetic pole layer 12' a pair of significantly reduced write fringe fields 15a' and 15b'.

While the inductive magnetic write transducer structure as illustrated in FIG. 2 typically exhibits significantly reduced write fringe fields in comparison with the inductive magnetic write transducer structure as illustrated in FIG. 1, the inductive magnetic write transducer structure as illustrated in FIG. 2 is typically not formed entirely without difficulties. One of the difficulties typically encountered when forming the inductive magnetic write transducer structure as illustrated in FIG. 2 is that a substantial portion of the patterned upper magnetic pole layer 16' is eroded under circumstances where: (1) the lower magnetic pole layer 12 and the patterned upper magnetic pole layer 16 are both formed of a permalloy (ie: nickel-iron, 80:20 w/w) magnetic material, as is common in the art of magnetic read-write head fabrication, (2) the gap filling dielectric layer 14 is simultaneously formed of an aluminum oxide dielectric material, as is similarly common in the art of magnetic read-write head fabrication; and (3) the magnetic write transducer structure whose schematic cross-sectional diagram is illustrated in FIG. 2 is etched from the magnetic write transducer structure whose schematic cross-sectional diagram is illustrated in FIG. 1 through an ion beam etch (IBE) method employing argon ions, as is similarly also common in the art of magnetic read-write head fabrication.

The substantial portion of the patterned upper magnetic pole layer 16 is typically eroded due to an ion beam etch (IBE) selectivity of the ion beam etch (IBE) method for the patterned upper magnetic pole layer 16 with respect to the gap filling dielectric layer 14. Typically, using a $N_2$ or Ar IBE, the ion beam etch selectivity of the patterned upper magnetic pole layer 16, when formed of a permalloy magnetic material, with respect to the gap filling dielectric layer 14, when formed of an aluminum oxide dielectric material, is from about 1:0.3 to about 1:0.6. That is the upper pole (16)Permalloy IBE rate is higher than the etch rate of the gap fill dielectric layer 14.

Problem 1: Erosion of the upper pole: Erosion of upper magnetic pole layers, such as the patterned upper magnetic pole layer 16, has been noted in the art of inductive magnetic read-write head fabrication, and it is typical in the art of inductive magnetic read-write head fabrication to compensate for the erosion by forming an upper magnetic pole layer with a substantial additional thicknesses beyond the thickness ultimately desired for a partially etched upper magnetic pole layer formed from the upper magnetic pole layer. See, for example, Krounbi et al., U.S. Pat. No. 5,438,747 (col. 11, line 68 to col. 12, line 5). Unfortunately, patterned upper magnetic pole layers, such as the patterned upper magnetic pole layer 16, formed with substantial additional thicknesses and thus significant aspect ratios, are often difficult to reproducibility form within magnetic transducer structures.

Although not specifically illustrated in FIG. 2, when fabricating a merged inductive write-magnetoresistive (MR) read magnetic head from the magnetic transducer structure whose schematic cross-sectional diagram is illustrated in FIG. 2, the partially etched lower magnetic pole layer 12' also serves as a top shield layer for a magnetoresistive (MR) sensor layer formed beneath the partially etched lower magnetic pole layer 12' within the merged inductive write-magnetoresistive (MR) read magnetic head. Under such circumstances, it is important that the partially etched lower magnetic pole layer 12' have sufficient remaining thicknesses at locations other than the location of the lower magnetic pole tip 12a in order to serve adequately as a top shield layer within the merged inductive write-magnetoresistive (MR) read magnetic head. While it is theoretically possible to assure adequate thicknesses of various portions of the partially etched lower magnetic pole layer 12' by increasing the thickness of the lower magnetic pole layer 12 from which is formed the partially etched lower magnetic pole layer 12', unfortunately, the thickness to which the lower magnetic pole layer 12 may be formed is itself often limited by design considerations when fabricating an inductive write-magnetoresistive (MR) read magnetic head.

Problem 2: Shadowing A related consideration pertinent to providing the partially etched lower magnetic pole layer 12' with sufficient thicknesses at locations other than the location of the lower magnetic pole tip 12a to serve adequately as a top shield layer for a magnetoresistive (MR) sensor layer fabricated beneath the partially etched lower magnetic pole layer 12' is that the etch rate of the partially etched lower magnetic pole layer 12' near the upper magnetic pole tip 16a within the partially etched patterned upper magnetic pole layer 16' is, as is illustrated in FIG. 2, reduced. The etch rate is reduced due to a shadowing effect inherent in the ion beam etch (IBE) method through which is conventionally formed the partially etched lower magnetic pole layer 12'. Due to the shadowing when the partially etched lower magnetic pole layer 12' is formed through the ion beam etch (IBE) method, there is formed as illustrated in FIG. 2 the lower magnetic pole tip 12a with a projection $T_2$ with respect to immediately surrounding portions of the partially etched lower magnetic pole layer 12', while portions of the partially etched lower magnetic pole layer 12' further removed from the lower magnetic pole tip 12a are etched to remove a thickness $T_1$ with respect to the lower magnetic pole layer 12, as illustrated in FIG. 2. In that regard, it is desirable within merged inductive write-magnetoresistive (MR) read magnetic head fabrication to provide partially etched lower magnetic pole layers, such as the partially etched lower magnetic pole layer 12', formed through etch methods which provide minimal shadowing, thus yielding partially etched lower magnetic pole layers where values of parameters which correspond with $T_1$ and $T_2$ are most closely approximate.

By way of example, if it is assumed that: (1) the etch rate of the material from which is formed the gap filling dielectric layer 14 as shown in FIG. 1 is equal to $R_{gap}$; (2) the etch rate of the material from which is formed the lower magnetic pole layer 12 as shown in FIG. 1 is equal to $R_{1p}$; (3) the gap thickness is equal to G as shown in FIG. 2; (4) the etch time is equal to t; and, (5) the convention ion beam etch (IBE) method shadowing effect provides an etch rate of the portion of the partially etched lower magnetic pole layer 12' most closely adjoining the partially etched patterned upper magnetic pole layer 16' one half the etch rate of the patterned lower magnetic pole layer 12' further removed from the partially etched patterned upper magnetic pole layer 16', as illustrated in FIG. 2, then the thicknesses $T_1$ as illustrated in FIG. 2 is determined in accord with equation 1 and the thickness $T_2$ as illustrated in FIG. 2 is determined in accord with equation 2.

$$T_1 = (t - G/R_{gap})R_{1p} \tag{1}$$

$$T_2 = (t - 2G/R)R_{ip}/2 = nG \tag{2}$$

Within equation 2, n typically varies from about 0.5 to about 3. Equation 3, equation 4 and equation 5 then follow from equation 1 and equation 2

$$t = 2nG/R_{1p} + 2G/R_{gap} \tag{3}$$

$$T_1 = (2nG/R_{1p} + G/R_{gap})R_{ip} \tag{4}$$

$$T_1/T_2 = T_1/nG = 2 + R_{1p}/nR_{gap} \tag{5}$$

Thus, it is seen from equation 5 that by selectively etching the material from which is formed the gap filling dielectric layer 14 with respect to the material from which is formed the lower magnetic inductor pole layer 12 within FIG. 1 there will be minimized the magnitude of $T_1$ with respect to $T_2$ as illustrated in FIG. 2.

A related difficulty encountered when forming from the patterned upper magnetic pole layer 16 whose schematic cross-sectional diagram is illustrated in FIG. 1 the partially etched patterned upper magnetic pole layer 16' whose schematic cross-sectional diagram is illustrated in FIG. 2 is illustrated by the schematic plan-view diagram of FIG. 3 and the schematic cross-sectional diagram of FIG. 4. The schematic plan-view diagram of FIG. 3 corresponds with the schematic cross-sectional diagram of FIG. 1. Shown in FIG. 3 is the gap filling dielectric layer 14 having formed thereupon the patterned upper magnetic pole layer 16, which in turn in part has formed thereupon a patterned photoresist layer 18 as is commonly employed to protect the coil region R2 of the patterned upper magnetic pole layer 16 when etching the pole tip region R1 of the patterned upper magnetic pole layer 16 to form the partially etched patterned upper magnetic pole layer 16'. Shown in FIG. 4 is a schematic cross-sectional diagram illustrating the results of etching the patterned upper magnetic pole layer 16 whose schematic plan-sectional diagram is illustrated in FIG. 3 to form the partially etched patterned upper magnetic pole layer 16'. The schematic cross-sectional diagram of FIG. 4 is obtained through the cross-sectional plan perpendicular to the cross-sectional plane employed in obtaining the schematic cross-sectional diagram of FIG. 2.

Shown in FIG. 4 is the partially etched lower magnetic pole layer 12' having formed thereupon the patterned gap filling dielectric layer 14' which in turn has formed thereupon or thereover: (1) a magnetic coil isolation dielectric layer 20 having formed therein a series of magnetic coils 22; (2) the partially etched patterned upper magnetic pole layer 16'; (3) and the patterned photoresist layer 18. As is illustrated in FIG. 4, the partially etched patterned upper magnetic pole layer 16' has a step 24 formed therein at the location of the patterned photoresist layer 18. The step 24 contributes to a significant step height H1 between the pole tip region R1 of the partially etched patterned upper magnetic pole layer 16' and the coil region R2 of the partially etched patterned upper magnetic pole layer 16'. Significant step heights within magnetic pole layers such as the partially etched patterned upper magnetic pole layer 16' are undesirable within the art of inductive magnetic read-write head fabrication since it is often difficult to accurately and reproducibly form upon those magnetic pole layers subsequent layers within the inductive magnetic read-write heads within which are formed those magnetic pole layers.

Various additional features of magnetic pole layer fabrication for use within inductive magnetic write heads have been disclosed by Krounbi et at. in U.S. Pat. No. 5,438,747, the teachings of which are incorporated herein fully by reference.

It is thus desirable to form within magnetic transducer structures which may be employed within inductive magnetic write heads self-aligned partially etched lower magnetic pole layers of permalloy alloy magnetic materials separated by patterned gap filling dielectric layers of aluminum oxide dielectric materials from partially etched patterned upper magnetic pole layers of permalloy alloy magnetic materials with minimal consumption of the partially etched patterned upper magnetic pole layers. It is also desirable to form within magnetic transducer structures which may be employed within inductive magnetic read-write heads partially etched patterned upper magnetic pole layers of enhanced flatness. Most desirable in the art are magnetic transducer structures which simultaneously possess the foregoing two characteristics. It is towards the foregoing goals the present invention is more specifically directed.

The importance of overcoming the various deficiencies noted above is evidenced by the extensive technological development directed to the subject, as documented by the relevant patent and technical literature. The closest and apparently more relevant technical developments in the patent literature can be gleaned by considering U.S. Pat. No. 5,438,747(Krounbi et al.) that teaches a pole trimming method. U.S. Pat. No. 5,867,890(Hsaia et al.) shows a RIE etch for pole tips. U.S. Pat. No. 5,726,841(Tong et al.) discloses a method for trimmed pole tips etched by Focused ion beam for undershoot reduction. U.S. Pat. No. 5,874,010 (Tao et al.) shows a Pole trimming method using $N_2$ ions. U.S. Pat. No. 5,878,481(Feng et al.) shows a pole trimming method for fabricating a magnetic transducer structure.

SUMMARY OF THE INVENTION

It is an object of this invention to provide an improved method for trimming pole-piece material during the manufacture of a read-write head.

It is another object of this invention to develop an improved IBE method to trim very narrow write head poles.

It is another object of this invention to use an improved IBE method to trim laminated pole-piece layers to fabricate a high data rate thin film head.

It is another object of this invention to provide a mask used during pole-piece trimming wherein the etching step employed during trimming exhibits a high degree of selectivity, tending to etch the write gap material (pole gap insulating layer) at a high rate compared to the etch rate of the pole-piece material (e.g., Permalloy).

It is another object of this invention to provide an IBE method using Kr or Xe to etch the write gap material at a high rate compared to the pole (P1 or P2) layers.

The invention teaches ion beam etch (IBE) having a high selectivity from the gap dielectric layer to the NeFe (upper and lower poles) for partial pole trim (PPT) applications by the following 3 preferred embodiments: a) selecting high IBE rate materials (e.g., NiCu alloys, Pd, and Pd—Cu alloys for the write gap materials, b) using IBE gas of Kr or Xr or both instead of Ar, and c) both a) and b).

To accomplish the above objectives, the present invention provides a method of manufacturing a head which is characterized by providing a structure comprising at least a substrate. We form a first layer of pole material over the substrate. Next, a write gap insulating layer formed on the first layer of pole material, the write gap insulating layer composed of a material having a high ion beam etch rate compared to the first and second layers of pole material. The write gap insulating layer is preferably composed of Ni—Cu alloy, Pd, Pd—Cu alloys.

Next, a second layer of pole material is formed on the first insulating layer; In a key step, we ion beam etch the second pole; the write gap insulating layer and the first layer; the second pole serving as an etch mask during the ion beam etching to form a head.

In a second preferred embodiment, the ion beam etching performed using a gas of Kr or Xe.

The present invention achieves these benefits in the context of known process technology.

a. It is compatible with current production tool and process.

b. It is a much cheaper and simpler process compared with RIE or RIBE process -No need for expensive tools and extensive tool maintenance.

c. There is no corrosion concern—No reactive gases used. In contrast, in conventional RIE or RIBE process, reactive gas(es) are needed, such as Cl or F based gases.

However, a further understanding of the nature and advantages of the present invention may be realized by reference to the latter portions of the specification and attached drawings.

BRIEF DESCRIPTION OF THE INVENTION

The features and advantages of a semiconductor device according to the present invention and further details of a process of fabricating such a semiconductor device in accordance with the present invention will be more clearly understood from the following description taken in conjunction with the accompanying drawings in which like reference numerals designate similar or corresponding elements, regions and portions and in which.

FIG. 1 to FIG. 4 show a series of schematic cross-sectional and plan-view diagrams illustrating a magnetic transducer structure having increased patterned upper magnetic pole layer consumption and increased patterned upper magnetic pole layer step height incident to forming within the magnetic transducer structure a partially etched patterned upper magnetic pole layer through a method conventional in the art of inductive magnetic read-write head fabrication.

Figure 6:
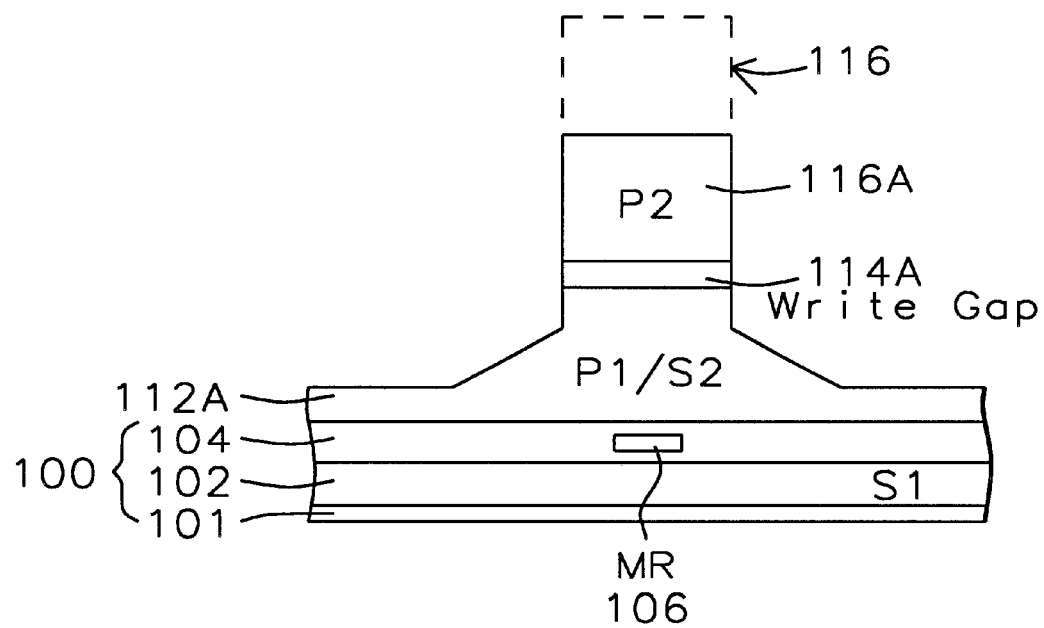

FIGS. 5 and 6 show the invention's embodiments for the Write gap layer 114 formed of a high ion beam etch (IBE)

rate material and the IBE performed with a high rate gas (e.g., Kr, or Xe).

Figure 7:
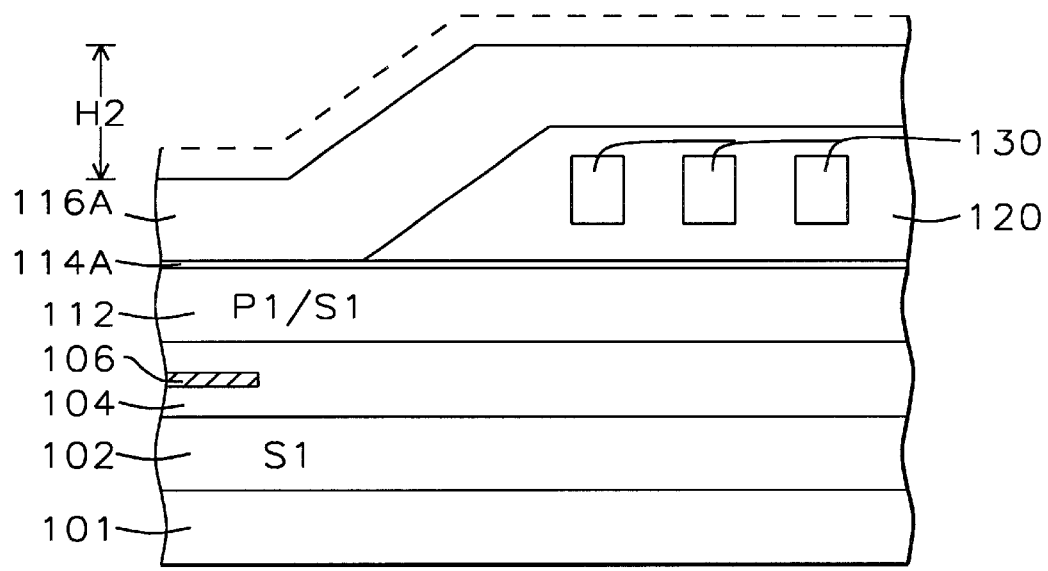

FIG. 7 is a cross sectional view showing the invention's embodiments for the Write gap layer 114 formed of a high ion beam etch (IBE) rate material and the IBE performed with a high rate gas (e.g., Kr, or Xe).

DETAILED DESCRIPTION OF THE PREFERRED EMBODIMENTS

A. Problems Overcome by the Invention

In a process known by the inventors, $Al_2O_3$ has been used as the write gap material. Because of the low IBE rate compared with NiFe (IBE rate ratio: $Al_2O_3$/NiFe=0.67), as well as the top pole shadowing effect, we run into two problems:

a. Top pole (S1/P1) on stitch head erosion is high (more than 1.5 μm removed for 3000 Å $Al_2O_3$ write gap layer)

b. Top shield erosion high (more than 1 μm removed for 3000 Å $Al_2O_3$ gap). It has been tried to reduced the pole and top shield erosion by a) RIE $Al_2O_3$ by Cl and b) RIBE $Al_2O_3$. However these methods need to be improved.

B. Overview of the Invention

The main idea of this invention is to obtain high IBE rate selectivity (to NiFe) in order to reduce the top pole erosion and top shield erosion by:

a. ($1^{st}$ embodiment) Using a Write gap layer 1140 composed of a high IBE rate material: such as, Ta Ni—Cu alloys, Pd, and Pd—Cu alloys, or b. ($2^{nd}$ embodiment) Changing IBE gas: such as Kr or Xe instead of conventional Ar, or $N_2$;

c. ($3^{rd}$ embodiment) a combination of a and b.

Data indicated that with IBE rate ratio Ni52Cu48/NiFe= 1.32, 0.5 μm less pole (P1) erosion and 0.3 μm less top shield (S1/P2) erosion can be realized.

The invention provides a method for manufacturing an inductive write element.

C. Transducer Structure

As shown in FIG. 5, we provide a structure 100 comprising a substrate 101. The structure 100 can comprise: a first shield layer (S1) 102 on a substrate 101., and a $1^{st}$ dielectric layer over the first shield layer (S1) 102; and a MR sensor 106 within the $1^{st}$ dielectric layer 106.

The $1^{st}$ layer of pole material 112 (P1/S2) (also serves as a second shield) over the $1^{st}$ dielectric layer.

The exact configuration, composition and method to form layers described above (layers below the P1 layer) can be varied and need not be as shown in the FIGURES. The FIGURES show only a representative device. Structure 100 can comprise any structure known to those skilled in the art.

The MR read structure is typically formed on a wafer 101, e.g. a ceramic wafer such as an $Al_2O_3$—TiC wafer. (This wafer is eventually cut into individual read-write heads after the inductive write element is completely formed.)

D. First Pole Layer 112

Next, we form a first layer 112 of pole material over the substrate. The first layer 112 is preferably composed of NiFe alloy preferably (low range) Ni 82% Fe 18% to (high range) Ni 45% Fe 55 (Wt %) and more preferably Ni 81% Fe 19% and having a thickness of between about 3.0 and 5.0 μm. In one embodiment, layers 28, 32 and 36 are an NiFe alloy, e.g. 82% Ni and 18% Fe (percentages are (+/−) 4%.

The first layer of pole material is preferably formed by sputtering or plating. Alternatively, these layers can be made from other high magnetic moment alloys such as iron-base crystalline alloys or cobalt-base amorphous alloys such as CoNiFe, FeAlN, or FeTaN.

E. $1^{st}$ Embodiment—Write Gap Layer 114

Then we form a write gap insulating layer 114 (G) formed on the first layer of pole material.

In a first embodiment of the invention, the write gap layer 30 is formed of a high IBE rate material. The write gap insulating layer is preferably composed of a material having a high ion Beam Etch rate with respect to the $1^{st}$ and $2^{nd}$ pole layers. The high ion Beam Etch rate is preferably between 2.01 and 1.5:1 and more preferably between 1.9:1 and 1.7:1 μm per minute.

The write gap insulating layer 114 is preferably composed of PdCu or Ni—Cu alloys (Ni45Cu55 to Ni58Cu42), Pd, Pd—Cu alloys (Pd60 Cu40 to Pd45 Cu55); and preferably having a high ion Beam Etch rate ratio (compared to the $1^{st}$ and second pole layers composed of NiFe) using ions of N2, Ar, Xe, Kr (most preferably Xe) between 2.0:1 and 1.5:1. Most preferably, the write gap layer 30 is composed of NiCu. These materials have a high IBE rate because they have a high sputter yield. The write gap layer are preferably formed using a sputtering process.

The write gap layer preferably has thickness of between about 3000 Å and 1000 Å.

In the second embodiment, the write gap Layer 30 is typically composed of NiCu, PdCu, $Al_2O_3$ or $SiO_2$ and alloy thereof.

TABLE 1

Overview of preferred embodiments of the invention

| Embodiment | material of write gap insulating layer | IBE etch gasses |
| --- | --- | --- |
| $1^{st}$ | high IBE etch rate material e.g., Ni—Cu alloy, Pd, Pd—cu alloys | any conventional- e.g., Ar or N |
| $2^{nd}$ | any conventional - | Kr or Xe |
| $3^{rd}$ | high IBE etch rate material e.g., Ni—Cu alloy, Pd, Pd—Cu alloys | Kr or Xe |

F. $2^{nd}$ Pole Layer 116

A second layer 116 of pole material formed on the write gap insulating layer 114 . The second layer is preferably composed of Ne45Fe55 and CoNiFe and having a thickness of between about 2.0 and 4.0 μm. The second layer of pole material is preferably formed by sputtering or plating. The second layer can be composed of the same materials as the first layer.

The second layer of pole material (P2) can be defined either by photoresist frame plating or ion beam milling. U.S. Pat. No. 5,438,747(Krounbi et al.) and U.S. Pat. No. 5,878, 481(Feng et al.) describe these methods which are known in the art. The P2 be a laminated pole comprised of several layers such as Ni45Fe/Al2O2/Ni45Fe55 or FeTaN/AlN/ FeTaN

G. Important IBE Etch Step

As shown in FIG. 6, in a key step, the second pole 226; the write gap insulating layer 114 and the first layer 112; are etched using an Ion beam etch (IBE). The second layer having a shape that defines a second pole tip region and a second magnetic coil region.

The second pole serves as an etch mask during the ion beam etching to form a head. In conventional IBE processes, Ar or N is used as the ion gas. These conventional gasses in combination with conventional write gap insulating layers cause problems by low etch selectivity because pole and write material.

In a $2^{nd}$ preferred embodiment of the invention, the ion beam etching is performed using a gas selected from the group consisting of Kr or Xe. The IBE preferably uses pure Kr or Xe. The invention's Kr or Xe IBE provide a high IBE selectivity between the NeFe first and second poles and the invention's high IBE rate write gap insulating layer 114.

FIG. 7 shows a cross sectional view of a completed device.

There is shown a schematic cross-sectional diagram of the magnetic transducer structure. The alternative schematic cross-sectional diagram of the magnetic transducer structure as illustrated in FIG. 7 is taken through a plane perpendicular to the air bearing surface plane of the schematic cross-sectional diagram of the magnetic transducer structure. As is illustrated in FIG. 7, the partially etched plated upper magnetic pole layer 116a is formed in accord with the preferred embodiment of the method of the present invention. Therefore, the partially etched plated upper magnetic pole layer 114a is formed with a step height H2 less than the step height H1 as illustrated with FIG. 4 for the partially etched patterned upper magnetic pole layer formed through methods as are conventional in the art of magnetic transducer structure fabrication, thus forming the partially etched plated upper magnetic pole layer 116a which is flatter than partially etched patterned upper magnetic pole layers formed through methods as are conventional in the art.

FIG. 7 also show the coils 130 and coil isolation dielectric layer 120.

H. Examples

The following non-limiting examples represent preferred forms and best modes contemplated by the inventor for practice of his invention, as well as illustrating the results obtained through its use.

The inventors have tested structures with High IBE write gap material of Ta and Ni 52Cu 48 at a IBE rate ratio at −40 degree etch angle using Ar IBE ions. The follow etch rate ratio where found.

Ta/NiFe=0.82

Ni52Cu 48/NiFe=1.32 compared to $Al_2O_3$/NiFe=0.67.

For the Ni52Cu48 write gap material, about 0.5 µm less pole material (P2) was removed for a 3000 Å write gap.

While the invention has been described with respect to specific embodiments, those skilled in the art will recognize that changes can be made in form and detail without departing from the spirit and scope of the invention. For example, the layers can have thicknesses other than those set forth above. In addition, these layers can be constructed from different materials. Various IBE systems can be used. One such system is model No. 38JG, available from Commonwealth Scientific Corporation of Virginia, but other systems can also be used. Accordingly, all such changes come within the present invention.

What is claimed is:

1. A method for manufacturing an inductive write element comprising the steps of:
   a) providing a structure comprising a substrate;
   b) forming a first layer of pole material over said substrate;
   c) forming an write gap insulating layer formed on said first layer of pole material, said write gap insulating layer composed of a material having a high ion beam etch rate; said write gap insulating layer composed of a material selected from the group consisting of (a) Ni—Cu alloys, (b) Pd, and (c) Pd—Cu alloys;
   d) forming a second layer of pole material formed on said first insulating layer; said second layer having a shape that defines a second pole tip region and a second magnetic coil region;
   e) ion beam etching said second layer; said write gap insulating layer and said first layer; said second pole serving as an etch mask during the ion beam etching to form a inductive write-magnetoresistive (MR) head.

2. The method of claim 1 wherein the ion beam etching performed using a gas selected from the group consisting of Ar, Ar/$N_2$, Kr and Xe.

3. The method of claim 1 wherein the ion beam etching performed using a gas selected from the group consisting of Kr and Xe.

4. The method of claim 1 wherein said first layer of pole material, said first insulating layer, and said second layer of pole material are formed by sputtering.

5. The method of claim 1 wherein said first layer composed of a NiFe alloy with a composition between 86% Ni and 14% Fe and 78% Ni and 22% Fe and having a thickness of between about 3.0 and 5.0 µm; said second layer composed of a NiFe alloy with a composition between 86% Ni and 14% Fe and 78% Ni and 22% Fe and having a thickness of between about 2.0 and 4.0 µm.

6. The method of claim 1 wherein said write gap insulating layer composed of a material selected from the group comprising; Ni—Cu alloy, Pd, Pd—Cu alloys with a composition between Pd60Cu40 and Pd45 Cu55; and preferably having a high ion beam etch rate between 1.9 and 1.7 µm/min.

7. The method of claim 1 wherein said write gap insulating layer composed of a NiCu alloy with a composition of between Ni45Cu55 to Ni58Cu42.

8. The method of claim 1 wherein said write gap insulating layer composed of a Pd—Cu alloys with a composition between Pd60Cu40 and Pd45 and Cu55.

9. A method for manufacturing an inductive write element comprising the steps of:
   a) providing a structure comprising a substrate;
   b) forming a first layer of pole material over said substrate;
   c) forming an write gap insulating layer formed on said first layer of pole material,
   d) forming a second layer of pole material formed on said first insulating layer; said second layer having a shape that defines a second pole tip region and a second magnetic coil region;
   e) ion beam etching said second layer; said write gap insulating layer and said first layer; said second pole serving as an etch mask during the ion beam etching to form a inductive write-magnetoresistive (MR) head; the ion beam etching performed using a gas selected from the group consisting of Kr or Xe.

10. The method of claim 9 wherein said write gap insulating layer composed of a material having a high ion beam etch rate between 2.0 and 1.5 µm/min.

11. The method of claim 9 wherein said first layer of pole material, said first insulating layer, and said second layer of pole material are formed by sputtering.

12. The method of claim 9 wherein said first layer composed of a NiFe alloy with a composition between 86%

Ni and 14% Fe and 78% Ni and 22% Fe and having a thickness of between about 3.0 and 5.0 µm; said second layer composed of a NiFe alloy with a composition between 86% Ni and 14% Fe and 78% Ni and 22% Fe and having a thickness of between about 2.0 and 4.0 µm.

13. The method of claim 9 wherein said write gap insulating layer composed of a material selected from the group comprising; Ni—Cu alloy, Pd, Pd—Cu alloys with a composition between Pd60Cu40 and Pd45 and Cu55; and preferably having a high ion beam etch rate between 1.9 and 1.7 µm/min.

14. The method of claim 9 wherein said write gap insulating layer composed of a NiCu alloy with a composition of between Ni45Cu55 to Ni58Cu42.

15. The method of claim 9 wherein said write gap insulating layer composed of a Pd—Cu alloys with a composition between Pd60Cu40 and Pd45 and Cu55.

16. A method for manufacturing an inductive write element comprising the steps of:

a) providing a structure comprising a substrate;

b) forming a first layer of pole material over said substrate;

c) forming an write gap insulating layer formed on said first layer of pole material, said write gap insulating layer composed of a material selected from the group consisting of (a) a NiCu alloy with a composition between 86% Ni and 14% Fe and 78% Ni and 22% Fe;

(b) Pd and (c) Pd—Cu alloys with a composition between Pd60Cu40 and Pd45Cu55;

d) forming a second layer of pole material formed on said first insulating layer; said second layer having a shape that defines a second pole tip region and a second magnetic coil region;

e) ion beam etching said second layer; said write gap insulating layer and said first layer; said second pole serving as an etch mask during the ion beam etching to form a inductive write-magnetoresistive (MR) head; the ion beam etching performed using a gas selected from the group consisting of Kr or Xe.

17. The method of claim 16 wherein said write gap insulating layer composed of a material having a high ion Beam Etch rate between 1.9 and 1.7 µm/min.

18. The method of claim 16 wherein said first layer of pole material, said first insulating layer, and said second layer of pole material are formed by sputtering.

19. The method of claim 16 wherein said first layer composed of a NiFe alloy with a composition between 86% Ni and 14% Fe and 78% Ni and 22% Fe and having a thickness of between about 3.0 and 5.0 µm; said second layer composed of a NiFe alloy with a composition between 86% Ni and 14% Fe and 78% Ni and 22% Fe and having a thickness of between about 2.0 and 4.0 µm.

* * * * *